Figure 1:
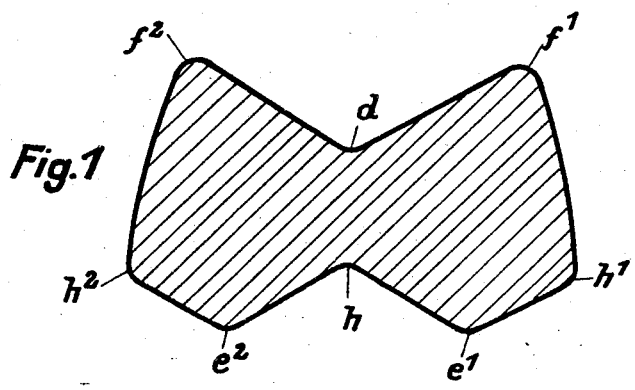

July 21, 1931.　　　　　L. HARTER　　　　　1,815,507

RUBBER TIRE

Filed Aug. 31, 1929

Inventor:
Ludwig Harter.
By Watson E. Coleman.
Attorney

Patented July 21, 1931

1,815,507

UNITED STATES PATENT OFFICE

LUDWIG HÄRTER, OF BERLIN-WANNSEE, GERMANY

RUBBER TIRE

Application filed August 31, 1929, Serial No. 389,818, and in Germany September 8, 1928.

My present invention relates to rubber tires for the wheels of vehicles and particularly to the form of the cross-section of such tires.

I have ascertained and verified beyond doubt, both by theoretical calculations and practical tests, that, in the case of a rubber body stressed under pressure, the form of the two boundary surfaces which intersect the direction of the pressure (i. e. the inner and outer peripheral surfaces) must be such that they converge relatively to each other so that pressure will be uniformly distributed over the whole of the stressed cross-section of the rubber body. In this respect the working material, rubber, does not differ radically from other similar materials, but as a result of its higher elasticity both the boundary surfaces in question which take up the stress directly are, according to the invention, provided with a form which deviates fundamentally from the forms hitherto in vogue and of which the characteristic feature is that the outer tread or running surface, starting from the lateral edges or walls of the tire and as far as the middle of the tire, approaches towards the inner or carrying surface, and so that the latter extends towards the tread surface both at the middle of the tire and also at the edges of the tire. The obtruding points or vertices of the inner or supporting surface lie nearer to the vertical central plane of the tire than the obtruding points or vertices of the tread surface.

If the rubber tire, according to my invention has to be provided with cavities, arranged in a known manner symmetrically with respect to the vertical middle plane of the tire, each cavity is constructed so that its walls which meet at a point in the interior of the tire, extend more or less parallel to the lateral faces or walls of the tire and so that the outermost cavity walls are outside the vertices of the under surface supporting the tire or else substantially coincident therewith.

It has been found that the wear on the tread surface of a rubber tire formed according to the present invention is uniformly distributed over the entire periphery of the tire and that the wear in consequence is merely a fraction of the wear which has hitherto been unavoidable in rubber tires. A further result of the uniform distribution of pressure over the whole tire cross-section is that no bending out or other similar deformation in the lateral walls of the tire is produced by the pressure stress.

It has already been proposed to employ a peripheral groove in the middle of the tire so as to increase the resistance of the running surface to skidding. However, such a groove does not increase the wearing and elastic properties of the tire unless its entire cross section is formed in accordance with the present invention; only in the latter case is a uniform distribution of the pressure stress over the entire cross-section of the tire attained.

In the accompanying drawings the three figures are axial cross-sections of different embodiments of the invention.

In the example diagrammatically illustrated in Fig. 1 the tire has a cross-section of which the tread or running surface, from the lateral edges or walls of the tire to the middle of the tire converges sharply at $d$ towards the inner or supporting surface (compare the tread surface $f^1$ $d$ and $f^2$ $d$). Furthermore the supporting surface rises towards the tread surface in the middle plane of the wheel (that is, at $h$), and also at the tire edges (namely, from the obtruding points or vertices $e^1$ and $e^2$ towards $h^1$ and $h^2$. The vertices $e^1$ and $e^2$ of the supporting surface are positioned nearer to the middle plane of the tire than the corresponding vertices $f^1$ and $f^2$ of the running surface.

Figure 2:
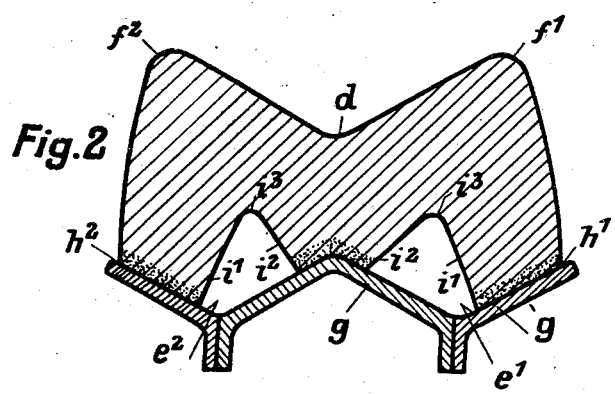

In Fig. 2 there is shown a constructional form of tire provided with cavities.

The tire is mounted by a vulcanizing process on a rigid felloe $g$ made up of several parts. The cavities are distributed symmetrically about the central plane of the tire in known manner. The walls $i^1$, $i^2$ of each cavity meet at points $i^3$ in the interior of the tire and extend in directions more or less parallel to the walls $h^1$, $f^1$ and running surfaces $f^1$, $d$ of the tire respectively. No unfavourable effect is thus produced on the uniform distribution of pressure over the entire cross-section of the cavities illustrated. It has also been found that, for the same purpose, it is necessary that the outer walls $i^1$, $i^1$ of the two cavities should cross the vertices of the carrying surface (compare $e^1$ and $e^2$ in Fig. 1) or terminate outside these vertices.

Figure 3:
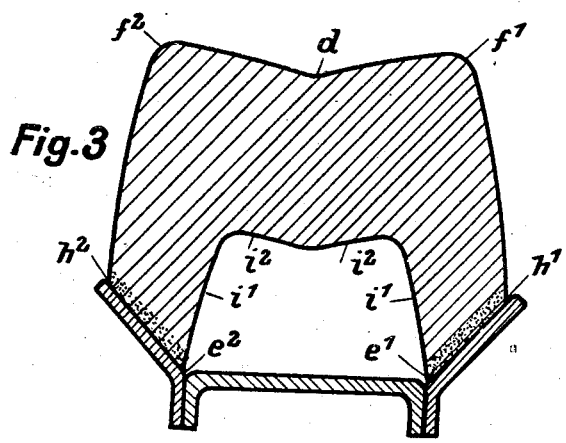

On the other hand the walls $i^2$, $i^2$, of the two cavities may be more or less inclined to each other, depending upon the elasticity requirements for the tire. In Fig. 3 there is shown a tire in which the walls $f^1$ $d$ and $d$ $f^2$ of the running surface are flatter than in the constructional forms shown in Figs. 1 and 2. Hence, in this case the walls $i^2$ and $i^2$ of the cavities now join each other in a correspondingly modified manner and the central supporting wall between the two cavities is dispensed with entirely.

What I claim as my invention and desire to secure by Letters Patent of the United States, is:

1. A resilient tire for vehicle wheels having a tread surface reentrantly U-shaped in cross section to provide two lateral vertices, and an inner or supporting surface which rises toward the tread surface both at the middle and adjacent the lateral faces of the tire and providing two vertices, the radially inner vertices on the inner or supporting faces of the tire lying nearer to the central plane of the tire than the radially outer vertices of said outer surface.

2. A rubber tire for a vehicle wheel having a tread surface reentrantly V-shaped in cross section, and providing two laterally disposed vertices, the inner or supporting surface of the tire being formed with a cavity, the walls of which extend toward the tread surface, the tread surface on each side of the cavity extending laterally and outward, the inner surface of the tire thus having two vertices, the vertices of the inner surface lying nearer to the medial radial plane of the tire than the vertices of the tread surface.

3. A rubber tire for vehicles having a reentrantly V-shaped tread surface, thus providing two lateral vertices, the side faces of the tire extending downward and outward from said vertices, the inner face of the tire being provided with a medially disposed cavity and laterally of said cavity the inner face of said tire extending laterally and outward, the lateral walls of the cavity being approximately parallel to the lateral walls of the tire, the lateral walls of the cavity substantially coinciding with the vertices on the tread of the tire.

4. A tire for vehicle wheels having its tread surfaces reentrantly V-shaped to provide two lateral vertices, the side faces of the tire extending inward and laterally outward from said vertices, the inner face of the tire from the inner corners of the lateral faces extending centrally inward and toward each other to points inward of the radial planes of said outer vertices, to thus form inner vertices, the inner face of the tire being formed with a cavity between the vertices of the inner face.

5. A tire for vehicle wheels having its tread surface reentrantly V-shaped to provide two lateral vertices, the side faces of the tire extending inward and laterally outward from said vertices, the inner face of the tire from the inner corners of the lateral faces extending centrally inward and toward each other to points inward of the radial planes of said outer vertices, to thus form inner vertices, the inner face of the tire being formed with a cavity between the vertices of the inner face, the lateral walls of said cavity being approximately parallel to the side faces of the tire, the outer wall of said cavity extending downward and inward convergently toward the medial radial plane of the tire.

In testimony whereof I affix my signature.

LUDWIG HÄRTER.